(12) United States Patent
Hufnagel et al.

(10) Patent No.: US 10,642,018 B2
(45) Date of Patent: May 5, 2020

(54) IMAGING DEVICE FOR MICROSCOPE

(71) Applicants: European Molecular Biology Laboratory, Heidelberg (DE); Karlsruher Institut fuer Technologie, Karlsruhe (DE); ACQUIFER AG, Karlsruhe (DE)

(72) Inventors: Lars Hufnagel, Heidelberg (DE); Uros Krzic, Munich (DE); Urban Liebel, Karlsruhe (DE)

(73) Assignees: KARLSRUHER INSTITUT FÜR TECHNOLOGIE, Karlsruhe (DE); DITABIS DIGITAL BIOMEDICAL IMAGING SYSTEMS AG, Pforzheim (DE); EUROPEAN MOLECULAR BIOLOGY LABORATORY, Heidelberg (DE)

( * ) Notice: Subject to any disclaimer, the term of this patent is extended or adjusted under 35 U.S.C. 154(b) by 55 days.

(21) Appl. No.: 15/256,981

(22) Filed: Sep. 6, 2016

(65) Prior Publication Data

US 2016/0377852 A1    Dec. 29, 2016

Related U.S. Application Data

(63) Continuation-in-part of application No. PCT/EP2015/054743, filed on Mar. 6, 2015.

(30) Foreign Application Priority Data

Mar. 6, 2014  (EP) .................................... 14158188

(51) Int. Cl.
*G02B 21/36* (2006.01)
*G02B 21/16* (2006.01)
(Continued)

(52) U.S. Cl.
CPC .......... *G02B 21/362* (2013.01); *G02B 21/06* (2013.01); *G02B 21/16* (2013.01); *G02B 21/26* (2013.01); *G02B 21/28* (2013.01)

(58) Field of Classification Search
CPC ...... G02B 21/362; G02B 21/06; G02B 21/16; G02B 21/26; G02B 21/28; G02B 21/0076
See application file for complete search history.

(56) References Cited

U.S. PATENT DOCUMENTS 6,630,108 B1    10/2003   Randrianarivo et al.
7,502,164 B2    3/2009    Lytle et al.
(Continued)

FOREIGN PATENT DOCUMENTS

EP     2 057 496       10/2012
JP     2002527744      8/2002
(Continued)

OTHER PUBLICATIONS

C. Moser et al. "Filter cubes with built-in ultrabright light-emitting diodes as exchangeable excitation light sources in fluorescence microscopy", Journal of Microscopy, vol. 222 (May 2006) pp. 135-140.*

*Primary Examiner* — Cara E Rakowski
(74) *Attorney, Agent, or Firm* — 24IP Law Group USA, PLLC; Timothy DeWitt

(57) ABSTRACT

An imaging device for a microscope (20) is disclosed that comprises a plurality of individual light sources (40) and a detector (15). The plurality of the individual light sources (40) is mounted on a translation stage (110). The imaging device further includes moveable optics arranged to direct a light path (45) onto a stationary sample (60) and collect reflected or fluoresced radiation from the sample (60).

8 Claims, 5 Drawing Sheets

(51) Int. Cl.
  *G02B 21/06* (2006.01)
  *G02B 21/26* (2006.01)
  *G02B 21/28* (2006.01)

(56) References Cited

U.S. PATENT DOCUMENTS

| | | | |
|---|---|---|---|
| 7,710,642 B2 | 5/2010 | Lytle et al. | |
| 2003/0030896 A1 | 2/2003 | Brooker | |
| 2005/0002093 A1* | 1/2005 | Bonaventura | G02B 21/26 359/391 |
| 2006/0187542 A1 | 8/2006 | Westphal et al. | |
| 2008/0043324 A1 | 2/2008 | Lytle et al. | |
| 2008/0310017 A1* | 12/2008 | Nolte | G02B 21/088 359/385 |
| 2009/0280559 A1* | 11/2009 | McCarthy | G02B 21/16 435/287.2 |
| 2010/0296727 A1* | 11/2010 | Stern | G01N 21/6452 382/154 |
| 2012/0326055 A1 | 12/2012 | Campbell et al. | |
| 2016/0187636 A1* | 6/2016 | Ingber | G02B 21/24 348/79 |

FOREIGN PATENT DOCUMENTS

| | | |
|---|---|---|
| JP | 2003-195177 | 7/2003 |
| JP | 2004 144839 | 5/2004 |
| JP | 2005250130 | 9/2005 |
| JP | 2006521574 | 9/2006 |
| JP | 2007133435 | 5/2007 |
| JP | 2010501086 | 1/2010 |
| JP | 2012018313 | 1/2012 |
| WO | 01/73374 A1 | 10/2001 |
| WO | 01/83374 | 11/2001 |
| WO | 2004/086117 A1 | 10/2004 |
| WO | 2012/051718 | 4/2012 |

* cited by examiner

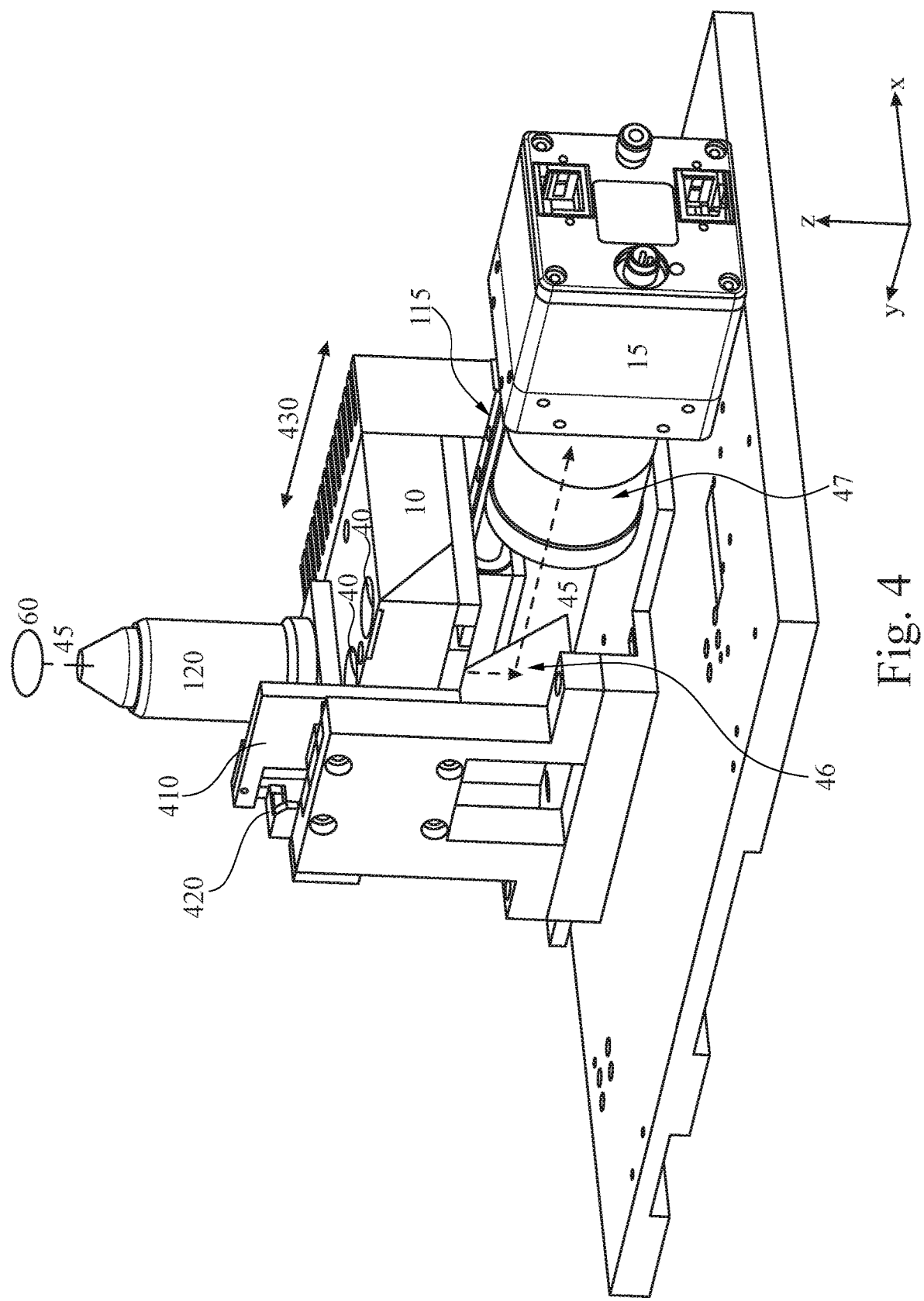

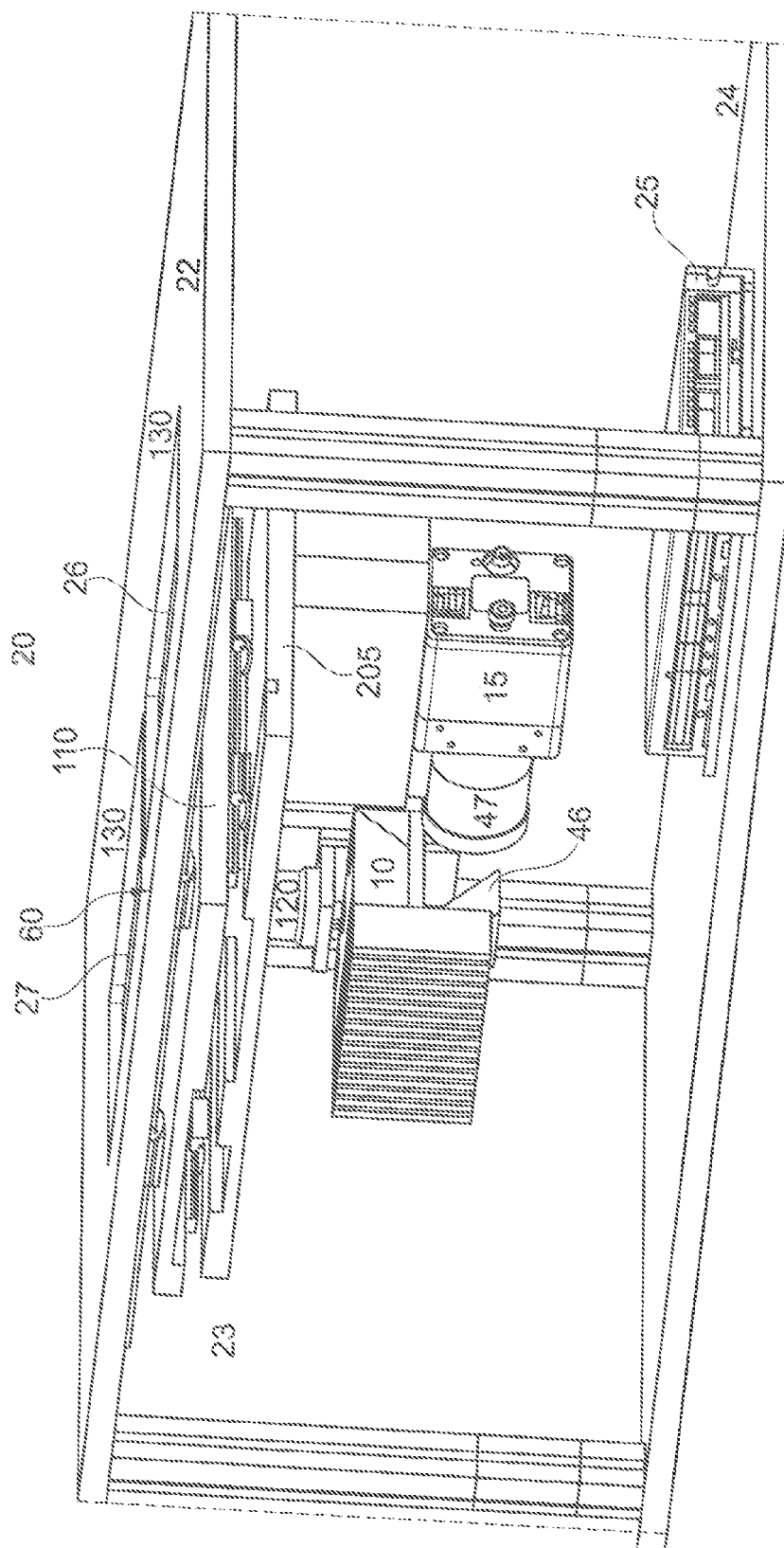

IMAGING DEVICE FOR MICROSCOPE

CROSS-RELATION TO OTHER APPLICATIONS

This application is a continuation in part of International Patent Application No. PCT/EP2015/054743 filed on 6 Mar. 2015 and claiming priority to European Patent Application No. 14 158 188.4 filed on 6 Mar. 2014, the disclosures of which are incorporated in their entirety.

BACKGROUND OF THE INVENTION

Field of the invention

This application relates to an imaging device for a microscope as well as a microscope incorporating the imaging device.

Brief Description of the Related Art

A microscope is a scientific instrument that is used to image objects, which either are too small themselves or have details that are too small to be visible to the naked eye. There are many types of microscopes available on the market. The most common of these and the first to be invented is the so-called optical microscope, wherein light that is reflected or transmitted by illuminated samples is imaged by a system of lenses to produce magnified images of the samples. The image from the optical microscope can be either viewed through an eyepiece or, more commonly nowadays, captured by a light-sensitive camera to generate a so-called micrograph. The images were previously captured on photographic film, but modern developments in charge-coupled device (CCD) cameras allow the capture of digital capture and storage of digital images.

The illumination sources used in optical microscopes have been developed over the years and wide varieties of illumination sources are currently available, which can emit light or other types of radiation at different wavelengths. Optical filters can be placed between the illumination source and the sample to be imaged in order to restrict the wavelength of the radiation illuminating the sample.

Modern biological microscopy uses fluorescent probes for imaging specific structures within a cell as the sample. In contrast to normal transilluminated light microscopy, the sample in fluorescence microscopy is illuminated through an objective lens with a narrow set of light wavelengths. These narrow set of light wavelengths interact with fluorophores in the sample, which then emit light of a different wavelength. This emitted/fluoresced light is used to construct the image of the sample.

U.S. Pat. No. 7,710,642 and U.S. Pat. No. 7,502,164 (Lytle at al., assigned to Westover Scientific, Mill Creek, Wash.) teach an illumination system for a fluorescent microscope. The illumination system disclosed in these two US patents include a carriage that is removably receivable within the microscope and a plurality of filter "cubes" that are arranged on the carriage. Each one of the filter cubes is movable between an active position and an inactive position. The filter cube comprises a housing, with first and second openings, as well as a solid-state light source secured to the housing. The solid-state light source emits radiation when the filter cube is moved into the active position. The filter cube further comprises at least one optical filter, which is disposed within the housing.

International patent application No. WO 2012/051718 teaches an automated slide scanning system for a microscope. The automated slide scanning system has an illumination system to illuminate an object, carried on a slide and to produce a returning light. A slide dispenser is configured to hold a plurality of slide holders, which are stacked vertically within the slide dispenser. A motorized scanning track is configured to pull the slide holder out of the slide dispenser onto the scanning track and to move the slide holder in one direction along an axis to image the object carried on the slide holder.

A paper by Moser at al. entitled "Filter Cubes with built-in ultrabright Light-Emitting Diodes as exchangeable Excitation Light Sources in Fluorescence Microscopy", published in the Journal of Microscopy, vol. 222, Part 2, May 2006, pages 135-140, teaches the use of ultrabright light-emitting diodes as a potential substitute for conventional excitation light sources in fluorescence microscopy. The ultrabright light-emitting diodes were integrated into a filter block of a conventional fluorescence microscope together with a collimating Fresnel lens, a holographic diffuser and emission filters.

U.S. Patent Application No. U.S. 2012/0326055 (Wilson et al, assigned to University Health Network) teaches a system for sub-surface fluorescence imaging with an excitation source and a light detector. The excitation source is a broadband light source and has an excitation filter wheel located in front of the broadband light source. The excitation filter wheel can filter light from the broadband light source at at least two excitation wavelengths. The light from the light source is projected onto a fairly large area of the sample.

International Patent Application No. WO 01/73374 (Büchler) discloses a measuring microscope with an electronic cameral that can be moved in any one of three axes about an object using drives.

One of the issues with the microscopes of the prior art is the need to move a sample into position for imaging. This movement (which involves both acceleration and deceleration of the sample) may result in distortion of the sample due to forces asserted on the (small) sample. The imaging of the sample is as a result not as accurate as it might otherwise have been.

SUMMARY OF THE INVENTION

An imaging device for use in a microscope is disclosed. The imaging device images at least one stationary sample and comprises a plurality of individual light sources and a detector. A light path from at least one of the plurality of individual light sources illuminates at least one stationary sample and reflected or fluoresced radiation from the stationary sample is detected by the detector. This arrangement enables different ones of the individual light sources to be moved and to illuminate the sample whilst keeping the sample stationary. The individual light sources reduce the amount of power consumed to generate the light compared to filtering light from a white light source and also enable the optical elements to be adjusted to the light from the individual light sources.

In one aspect of this disclosure, a Peltier device is arranged between at least one of the plurality of individual light sources and a heat sink.

The imaging device may further comprise a spectral filter that is arranged in the light path between at least one of the plurality of individual light sources and the stationary sample. The spectral filter may be a band-pass filter, a low-pass filter, a high-pass filter or a combination thereof.

The imaging device may further comprise a diffuser arranged in the light path.

The imaging device may further comprise a motor that is adapted to move the to plurality of individual light sources with respect to an immovable sample holder on which the sample is mounted.

The disclosure also teaches a microscope with an objective lens for illuminating and imaging a sample, a translation stage on which the imaging device is mounted, a sample holder, and a detector. The imaging device, the objective lens and the sample holder are so arranged that a light path passes from at least one of the plurality of individual light sources to the stationary sample through the objective lens.

The samples to be imaged remain stationary. The objective lens can be positioned with respect to the samples. The objective lens maintains its relative position to the sample, whilst the individual light sources are moved.

DESCRIPTION OF THE FIGURES

FIG. 4 shows a further view of the optic platform

FIG. 5 shows a view of another aspect with an inverted mounting of the translation stage of the screening microscope.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
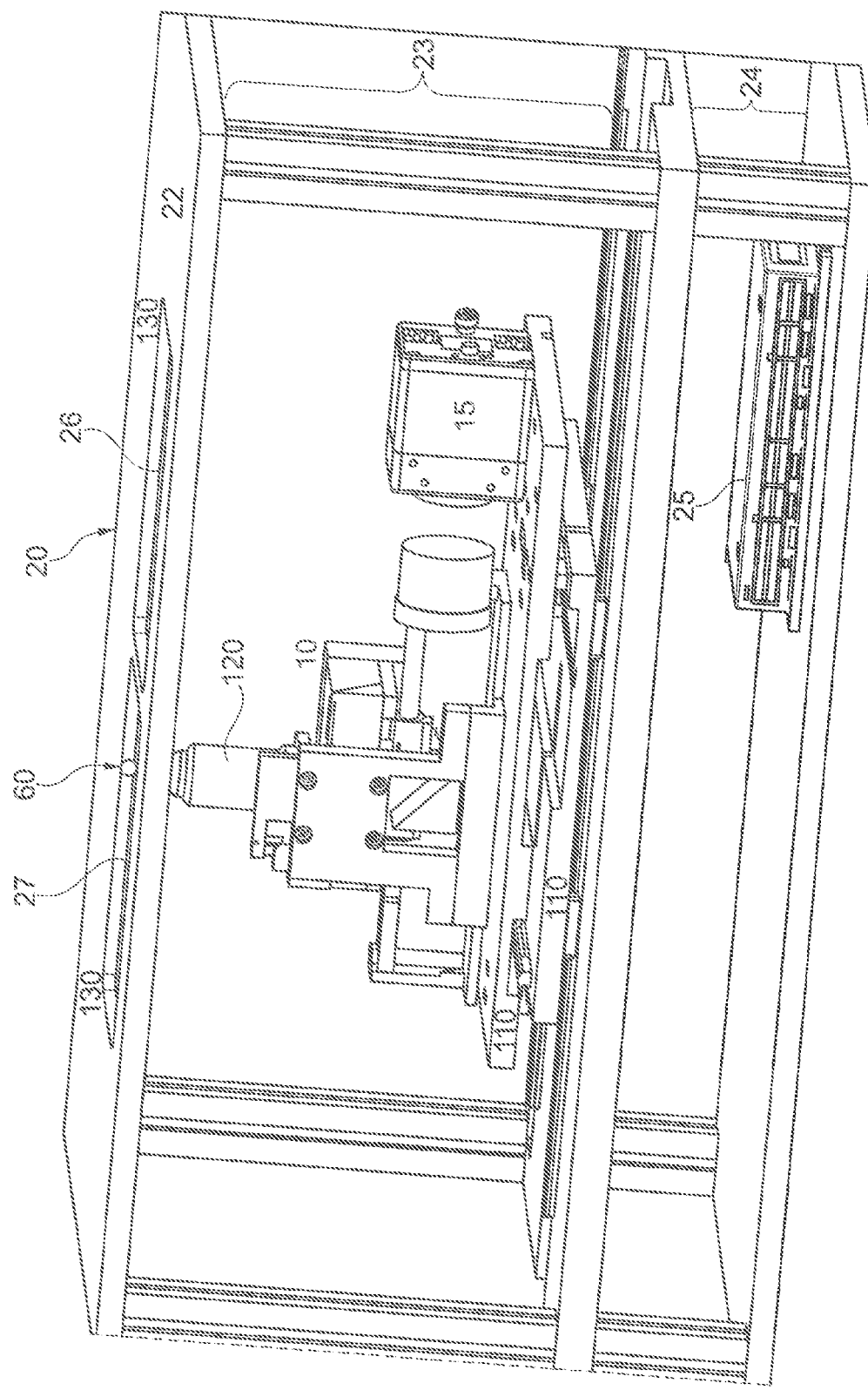
FIG. 1 shows an overview of the screening microscope of this disclosure.

FIG. 1 shows an exemplary overview of a screening microscope 20. It will be seen that the screening microscope 20 is arranged in essentially three levels. A top level 22 has two openings 26 and 27. A middle level 23 has moveable optics and translation stages, as will be explained below in connection with FIG. 2. A bottom level 24 includes control components 25. A plurality of sample holders 130 can be arranged in the openings 26 and 27. Each one of the sample holders 130 can contain one or more samples 60. The sample holders 130 are arranged immovably in the openings 26 and 27. In other words, the samples 60 are not moved (are stationary) during an imaging process. The sample holders 130 could be in one or both of the openings 26 and 27. One of the samples 60 is shown in the sample holder 130 in the opening 27. The sample holder 130 itself is not shown in FIG. 1.

The sample holders 130 can be removed from the openings 26 and 27 after completion of the imaging process. It will be appreciated that the screening microscope 20 of FIG. 1 has two openings 26 and 27 illustrated, but the top level 22 can comprise a single opening or a larger number of openings.

The middle level 23 comprises the moveable optics and the translation stages. An illumination device 10 is mounted on a translation stage 110. A detector or imaging device, such as a camera 15, is also mounted on the translation stage 110. The illumination device 10 has a plurality of individual light sources 40 (not shown in FIG. 1, but shown in FIGS. 2 and 3), which produce light that is directed along a light path 45 (shown in FIG. 3) through the optics onto one or more of the samples 60. Typical focal areas of the light on the samples 60 are between about 0.1 mm and 4 mm, but these are not limiting of the invention. The reflected or fluoresced light from the samples 60 along a return light path 45' (shown in FIGS. 3 and 4) is directed into the camera 15, which then creates and stores micrographs. The moveable optics and translation stages are illustrated in more detail in FIG. 2.

The bottom level 24 is configured to have the control components 25 and any cooling devices.

Figure 2:
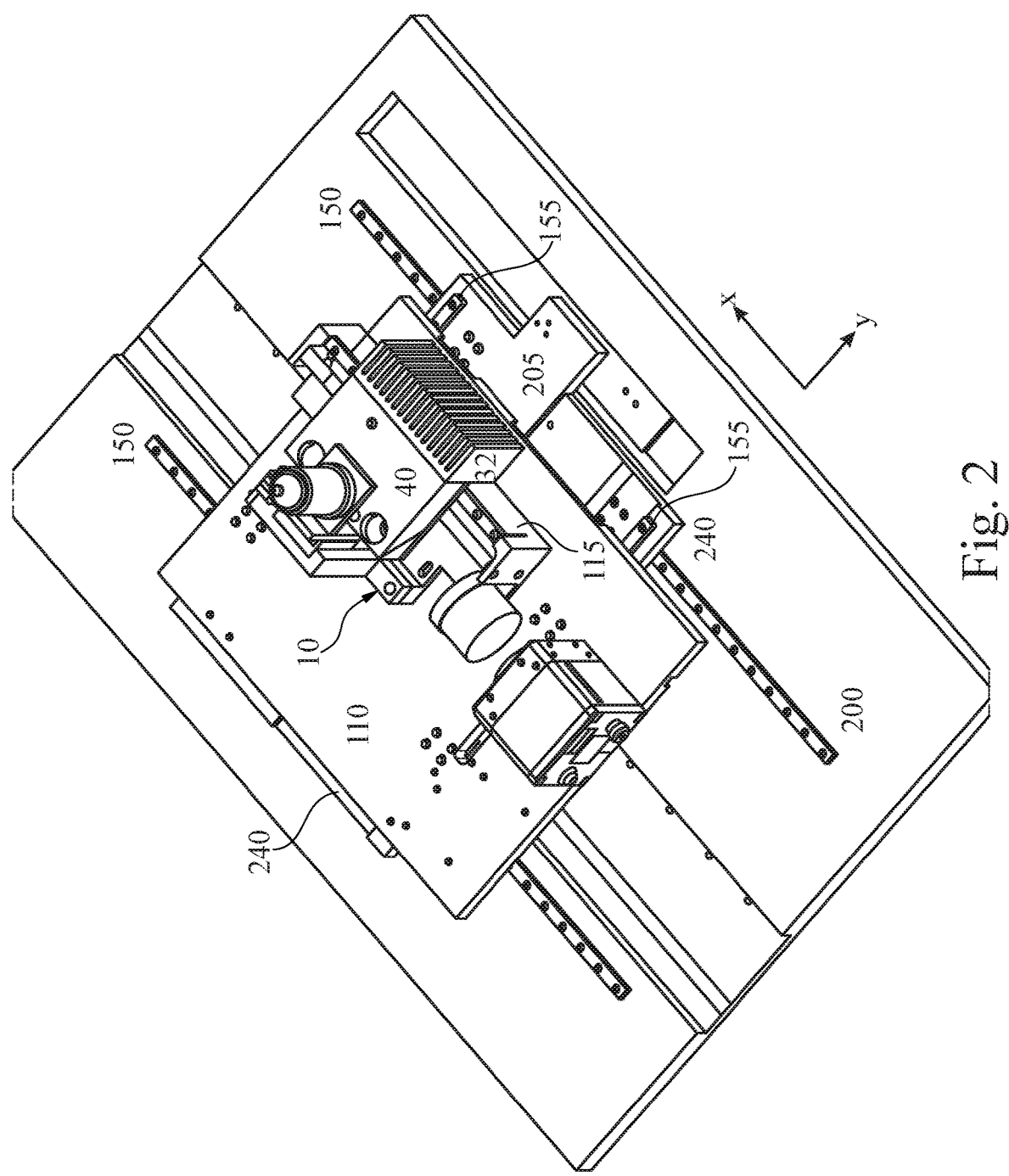
FIG. 2 shows a detailed view of the translation stage of the screening microscope.

FIG. 2 shows the moveable optics and translation stages in more detail. FIG. 2 shows the illumination device 10 mounted onto the translation stage 110. The illumination device 10 is located on a first translation rail 115 and can be moved backwards and forwards in one dimension along the first translation rail 115 (for the sake of convenience this is shown as the x-dimension in FIG. 2, but this is not limiting of the invention). Different ones of the individual light sources 40 are directed into an objective lens 120. In FIG. 2, three individual light sources 40 are present, but this is not limiting of the invention. The camera 15 is mounted immovably on the translation stage 110.

The translation stage 110 is mounted on an intermediate stage 205, which has two second rails 155. The translation stage 110 can move on the second rails 155 in the y-direction with respect to the intermediate stage 205. The intermediate stage 205 is movable along third rails 150 in the x-direction. The illumination device 10 and the objective lens 120 are thus able to move in both the x and y directions. The illumination device 10 and the objective lens 120 remain fixed in relation to each other with respect to the x- and y-directions, whilst the position of the individual light sources 40 source is not changed. Linear motors 240 are used to move the translation stage 110.

Figure 3:
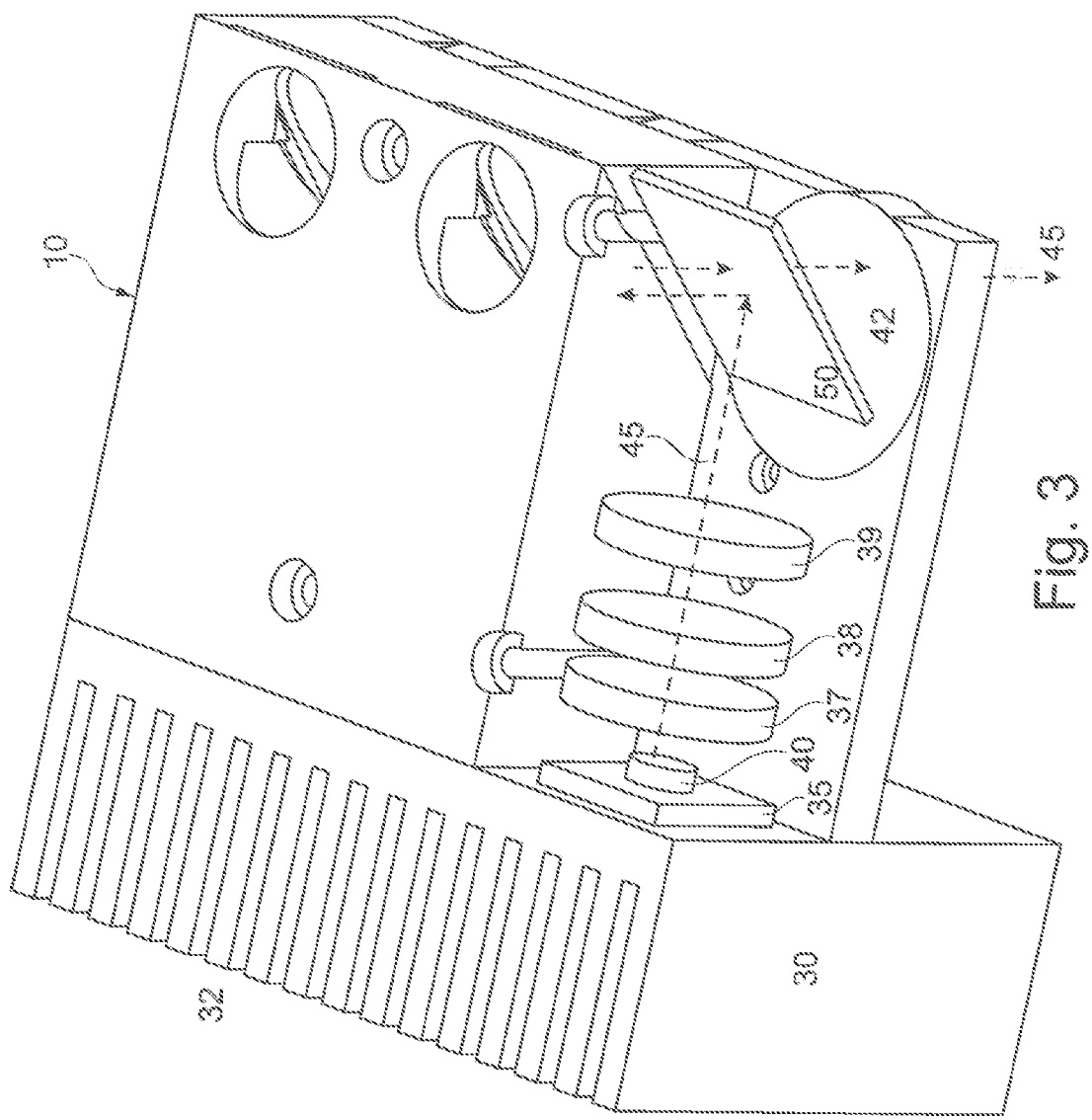
FIG. 3 shows a detailed view of the optic platform incorporated into the screening microscope.

FIG. 3 shows the illumination device 10 in more detail. The individual light source 40 is mounted on a heat sink 30 with cooling fins 32. A Peltier device 35 can be incorporated between the heat sink 30 and the light source 40 to cool the individual light source 40. The individual light source 40 is in one aspect of the invention a light-emitting diode, but this is not limiting of the invention. Three light paths 45 with the corresponding individual light sources 40 are illustrated in FIG. 3. One of the light paths 45 is shown cutaway to reveal details.

The radiation from each one of the individual light sources 40 passes through a collimator lens 37, a spectral filter, e.g. band-pass filter, 38, and a diffuser 39 (not shown), as shown in FIG. 3, before the light path 45 reaches a beam splitter 50 that deflects the filtered radiation through an objective lens 120 (shown in FIGS. 1 and 2) onto the sample 60 arranged in one of the openings 26, 27 of the top level 22. The order of the collimator lens 37, the spectral filter 38, and the diffusor 39 and the dichroic filter 41 within the light path 45 is not limited to the order shown in FIG. 3. The sample 60 reflects or fluoresces radiation back through the objective lens 120. The reflected or fluoresced radiation passes along the return light path 45' through an emission filter 42 and is imaged by the camera 15 (not shown in FIG. 3). The radiation of the sample 60 is carried out by scanning sections of the sample 60.

FIG. 4 shows a perspective view of the translation stage 110 in the middle level 23 with the moveable optics and the first translation rail 115. FIG. 4 shows additionally a z-stage 410 on which the objective lens 120 is mounted. The z-stage 410 is moved in the z-direction by a z-motor 420. A further linear motor is mounted on the underside of the translation stage 110 and is able to move the translation stage 110 in the y direction. A linear motor is used to move the illumination device 10 in the x-direction, as indicated by the arrows 430. The objective lens 120 remains fixed on the z-stage 410 and the illumination device 10 can therefore be moved such that different ones of the light sources 40 can direct radiation into the objective lens 120. The radiation along the return light path 45' is deflected by a reflector, such as a mirror 46 into an imaging objective 47 before the radiation passes into the camera 15.

The illumination device 10 comprises a plurality of light sources 40 in the examples of FIGS. 3 and 4, only three individual light sources 40 are shown. It will be appreciated that different ones of the individual light sources 40 have different associated spectral filters 38. In other aspects of the illumination device 10 between two and five light sources 40 can be provided.

The illumination device 10 uses the individual lights sources 40, rather than a white light source and filtering the required wavelengths, because this is more efficient. It is known that the chemical markers for fluorescent microscopy usually have a very narrow excitation spectrum in the range of 10-20 nm. Filtering a narrow band of light or radiation from a white light source would therefore "waste" a significant amount of energy, e.g. more than 90%. This would therefore require a stronger white light source to yield the same amount of power in the light in the filtered narrow band. This stronger white light source would result in a higher heat production and therefore need active cooling.

Furthermore, the power density of a white light source is also non-uniform and this results in different and varying excitation power in the wavelength bands of interest. The use of the individual light sources 40 enables tuning for each wavelength band the amount of power to match the biological application. Tuning of the optical elements in the optical arrangement, including the cleanup filter 38, the diffusor 39 and the collimation lens 37, is also simplified.

The individual light sources 40 are light emitting diodes with power ranges of 100 mW to a few Watts. Typical wavelengths used are given in the table below:

| | |
|---|---|
| UV | 405 nm |
| Violet | 420 nm |
| Royal Blue | 455 nm |
| Blue | 470 nm |
| Blue | 490 nm |
| Cyan | 505 nm |
| Green | 530 nm |
| Lime | 565 nm |
| Amber | 590 nm |
| Amber | 595 nm |
| Orange | 617 nm |
| Red | 625 nm |
| Deep Red | 660 nm |

It will be understood that the translation stage 110 can be moved in both the x and y directions in order to enable various ones of the samples 60 mounted in the openings 26, 27 of the top level 22 of the screening microscope 20 to be imaged.

FIG. 5 shows another aspect of the screening microscope in which the translation stage 110 and the intermediate stage 205 are "inverted" and hung from the underside of the top level 22. Otherwise, the elements are identical with the aspect of the invention illustrated in FIG. 1.

REFERENCE NUMERALS

10 Illumination device
15 Camera
20 Screening microscope
22 Top level
23 Middle level
24 Bottom level
25 Control components
26 Opening
27 Opening
30 Heat sink
32 Cooling fins
35 Peltier device
37 Collimator lens
38 Spectral filter
39 Diffuser
40 Light sources
41 Dichroic filter
42 Emission filter
45 Light path
45' Light path
46 Mirror
47 Imaging objective
50 Beam splitter
60 Sample
110 Translation stage
115 First translation rail
120 Objective lens
130 Sample holder
150 Third rails
155 Second rail
205 Intermediate Stage
240 Linear Motor
410 Z stage
420 Z motor
430 Arrows

What is claimed is:

1. A microscope comprising:
a support member;
a first stage movably mounted to said support member, said first stage being movable relative to said support member in a first direction;
a second stage movably mounted to said first stage, said second stage being movable relative to said first stage in a second direction different than said first direction;
an objective lens mounted to said second stage;
an illumination device movably mounted to said second stage, said illumination device being movable on said second stage relative to said objective lens in a third direction, said illumination device comprising:
a plurality of individual light sources for illuminating at least one stationary sample through said objective lens, wherein different ones of said plurality of individual light sources can be aligned with said objective lens by moving said illumination device relative to said objective lens in said third direction, wherein said third direction is the same as one of said first and second directions; and
a detector for detecting radiation from an illuminated one of the at least one stationary sample;
wherein the illumination device, the objective lens, and the detector are movable in a plane formed by said first direction and said second direction.

2. The microscope of claim 1, further comprising a Peltier device, arranged between at least one of the plurality of individual light sources and a heat sink, on which the plurality of individual light sources is mounted.

3. The microscope of claim 1, further comprising a band pass filter arranged in the light path between the at least one of the plurality of individual light sources and the stationary sample.

4. The microscope of claim 3, further comprising a diffuser being arranged in the light path between the band pass filter and the stationary sample.

5. The microscope of claim 1, wherein the individual light sources are light emitting diodes.

6. The microscope of claim 1, further comprising a plurality of translation rails cooperating with at least one motor to move the illumination device, the objective lens, and the detector with respect to the stationary sample.

7. The microscope of claim 1, wherein the second stage is movably mounted on the first stage in the first direction, the first stage being movably mounted on the support member in the second direction, and
    the illumination device is movable with respect to the second stage in the second direction.

8. The microscope according to claim 1, wherein said illumination device further comprises:
    a spectral filter associated with each of said individual light sources, each said spectral filter being different.

\* \* \* \* \*